(No Model.) 2 Sheets—Sheet 1.
C. S. AMBRUSTER.
HAY FORK.
No. 316,719. Patented Apr. 28, 1885.
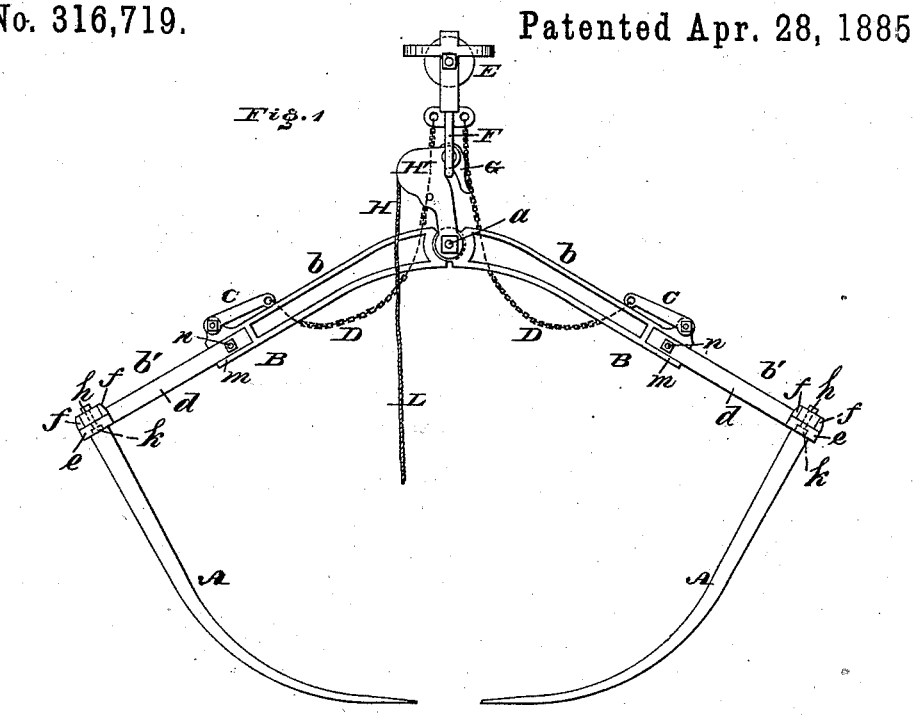
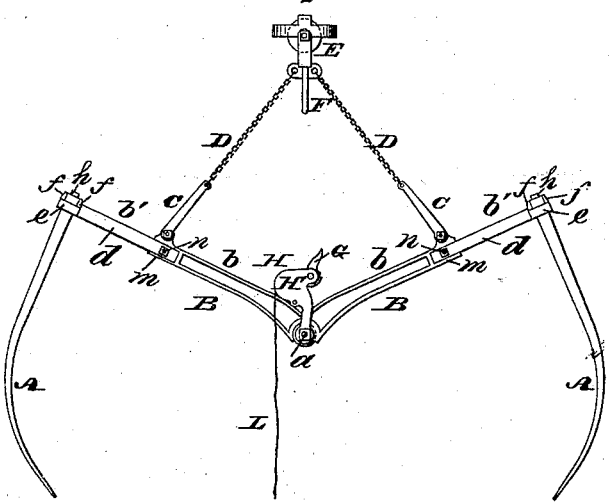
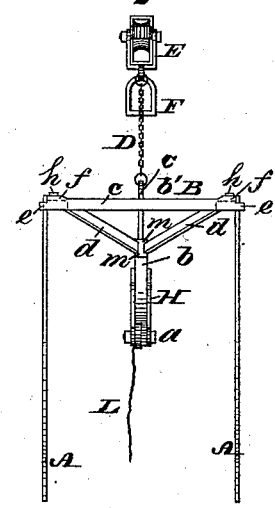
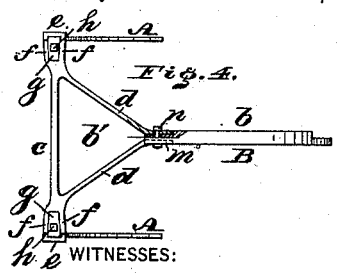
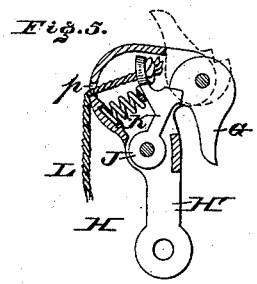
WITNESSES:
Ag. P. Grant
W. F. Kircher
INVENTOR:
Charles S. Ambruster,
BY John A. Wiedersheim
ATTORNEY.

(No Model.) 2 Sheets—Sheet 2.
C. S. AMBRUSTER.
HAY FORK.
No. 316,719. Patented Apr. 28, 1885.
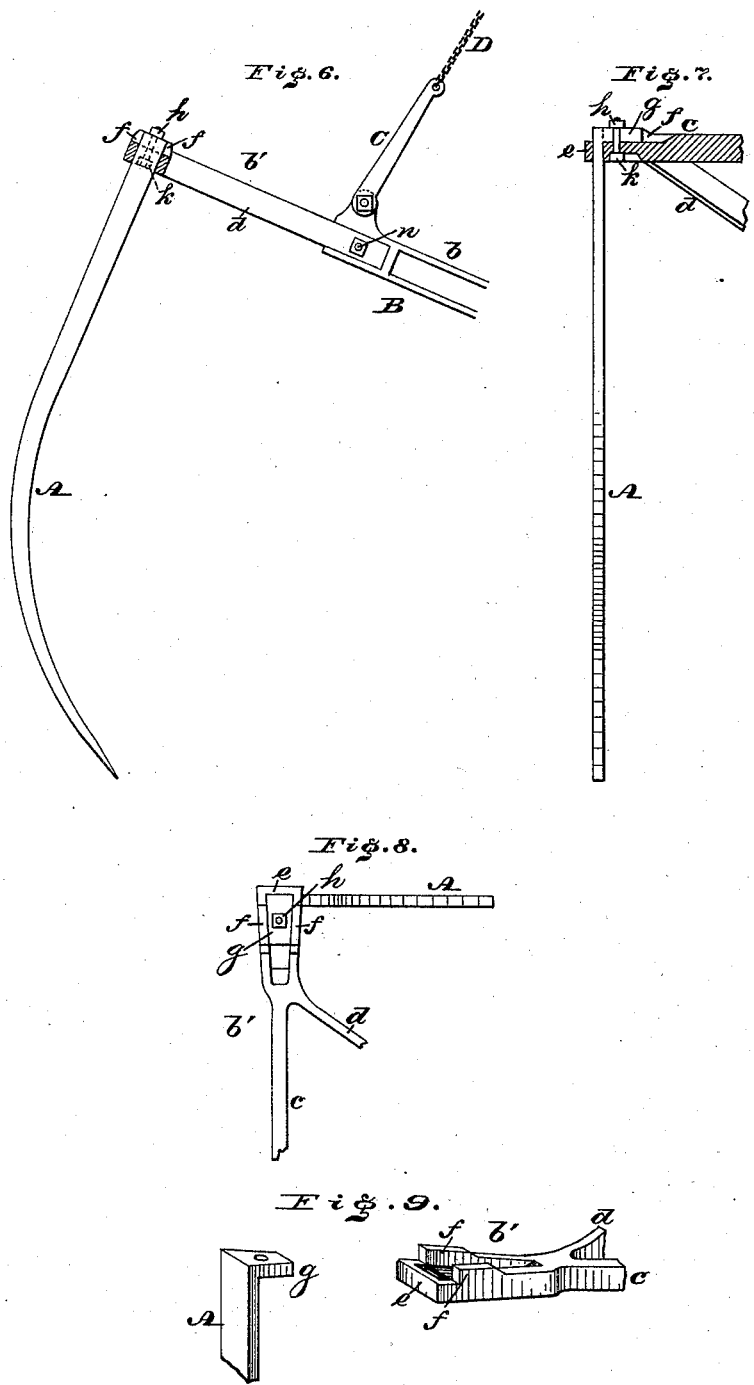
WITNESSES:
A. P. Grant,
W. F. Kircher
INVENTOR:
Charles S. Ambruster,
BY John A. Wiedersheim
ATTORNEY.

UNITED STATES PATENT OFFICE.

CHARLES S. AMBRUSTER, OF YORKTOWN, NEW JERSEY, ASSIGNOR OF ONE-HALF TO JEREMIAH S. WATSON, OF SAME PLACE.

HAY-FORK.

SPECIFICATION forming part of Letters Patent No. 316,719, dated April 28, 1885.

Application filed December 20, 1883. (No model.)

*To all whom it may concern:*

Be it known that I, CHARLES S. AMBRUSTER, a citizen of the United States, residing in Yorktown, county of Salem, State of New Jersey, have invented a new and useful Improvement in Hay-Forks, which improvement is fully set forth in the following specification and accompanying drawings, in which—

Figure 1 is a side elevation of a hay-fork embodying my invention. Fig. 2 is a side elevation on a reduced scale showing the fork unloaded. Fig. 3 is a view at a right angle to Fig. 2. Fig. 4 is a top or plan view of a portion thereof, a portion thereof being in horizontal section. Fig. 5 is an enlarged side view, partly in section, of the tripping device. Fig. 6 is a view, partly sectional, of a portion of Fig. 2 on an enlarged scale. Fig. 7 is a view, partly sectional, of a portion of Fig. 3 on an enlarged scale. Fig. 8 is a view of a portion of Fig. 4 on an enlarged scale. Fig. 9 is a perspective view showing the manner of securing a tine in position, the relative parts being separated.

Similar letters of reference indicate corresponding parts in the several figures.

My invention consists of certain improvements in hay-forks, whereby the same possesses increased strength and operates with ease and promptness, as will be hereinafter fully set forth.

Referring to the drawings, A represents forks or tines, which are connected with heads B B, the latter being pivoted to each other, as at $a$, and formed of metal. Each head consists of an arm, $b$, to which is bolted a casting, $b'$, formed of a cross-bar, $c$, and bifurcated arms $d$, the inner ends of the latter being bolted to the arm $b$. The bar $c$ is formed at its ends with eyes $e$, and adjacent thereto with flanges $f$. The tine is passed through the eye $e$, and has an inward offset upon the upper end, the offset $g$ resting between the flanges $f$. A bolt, $h$, is passed through the offset $g$ and bar $c$, and provided with a tightening-nut, $k$, whereby the tine and head are securely connected, and turning of the tines is prevented, owing to the embracing action of the flanges $f$ and walls of the eyes $e$. The bifurcated arms $d$ are fitted at their converging ends between flanges $m$ on the contiguous ends of the arms $b$, and bolted, as at $n$, to said ends, thus securely connecting the castings $b'$ with the arms $b$, and as the arms $d$ and bars $c$ form triangular frames they spread the heads and produce light and strong structures. The upper sides of the heads have pivoted to them the links C C, which are located between the ends of the heads, preferably nearer to the outer ends thereof, and to said links are connected cords or chains D D, whose upper ends are attached to the frame of the pulley or sheave E, said frame being also provided with an eye, F, at bottom, which is adapted to engage with the catch G of the tripping device H.

H' represents a frame or casing to which said catch is pivoted, and to said frame is also pivoted a dog, J, whose nose is adapted to interlock with a shoulder formed on the catch G, said dog being pressed against the catch by means of a spring, K, which is properly fitted within the casing H'. Attached to the dog is a rope or cord, L, which passes through an opening, $p$, in the casing H' to within convenient reach of the operator. The tines are pushed into the hay and forced toward each other, so as to inclose the load to be elevated. The sheave or pulley is lowered, and the eye F fitted to the catch G, the parts being in position shown in Fig. 1, it being noticed that the catch points downwardly, and is firmly held by the dog J, (see Fig. 5,) and the chains D and links C are slack. The sheave or pulley is then raised and carries with it the tripping device H, and consequently the tines with their load of hay. When the desired locality is reached, the cord L is drawn, thus forcing the dog J from the catch G, whereby the latter is tripped and no longer controlled by the former, and it quickly turns on its axis in an upward direction, so that the eye F slips from the catch and completely disconnects the sheave or pulley and the tripping device. The chains D and links C now become operative, and, owing to the weight transferred to them, are straightened out, thus causing the heads B to turn upwardly on their connecting or axial bolt, and separating the tines from below, whereby the hay drops and the tines are cleared and unloaded, the position of parts being as in Fig. 2, after which the device is lowered and the operations hereinbefore stated may be repeated, as desired. The casing H' incloses the dog J, and spring K, and head of the catch G, and prevents clogging of the same by hay and dirt, the upper part of said frame or casing H' constituting walls for inclosing the dog and spring, whereby the latter are guarded, and the dog is prevented from being improperly or accidentally operated by blows.

The tripping device and heads B B are connected by the bolt $a$ as a common axis, thus simplifying the construction of the fork and locating said device at the middle, where it is not liable to injure the workman or operator.

Having thus described my invention, what I claim as new, and desire to secure by Letters Patent, is—

1. In a hay-fork having the heads B, each formed of an arm, and a casting consisting of a cross-bar, and bifurcated arms connected at their inner ends with said arm of the head, substantially as and for the purpose set forth.

2. A tine having an offset at its end, and the cross-bar of the head having an eye through which the end of the tine is passed, and flanges between which the offset is seated, said offset and bar being bolted together, substantially as and for the purpose set forth.

3. In a hay-fork, a tripping device composed of the frame H', having the opening $p$, and provided with the catch G, dog J, spring K, normally operating to keep the dog J in engagement with the catch G, and the rope L, connected to the dog J, the said frame being pivoted to the heads of the fork, having the said catch G connected to it, the frame being formed at its upper end with walls, which inclose the dog J and spring K, substantially as and for the purpose set forth.

4. In a hay-fork, the heads carrying tines, and provided with chains connected therewith, in combination with an elevating-sheave and a tripping device, the latter having a common axis with said heads, and having the dog thereof held normally in engagement with a catch by means of a spring, substantially as and for the purpose set forth.

CHARLES S. AMBRUSTER.

Witnesses:
JOHN A. WIEDERSHEIM,
A. P. GRANT.